United States Patent [19]

Itoh

[11] 4,321,281
[45] Mar. 23, 1982

[54] PROCESS FOR ELECTROSTATIC COATING WITH PULVERIZED MATERIAL AND APPARATUS USED IN SAID PROCESS

[75] Inventor: Tsutomu Itoh, Tokyo, Japan

[73] Assignee: Onoda Cement Co., Ltd., Yamaguchi, Japan

[21] Appl. No.: 8,564

[22] Filed: Feb. 1, 1979

Related U.S. Application Data

[63] Continuation of Ser. No. 849,533, Nov. 8, 1977, abandoned.

[30] Foreign Application Priority Data

Nov. 10, 1976 [JP] Japan .................. 51/134161

[51] Int. Cl.³ .......................... B05B 5/08; B05D 1/06
[52] U.S. Cl. ...................................... 427/33; 118/624; 118/630; 118/634; 118/621; 427/195
[58] Field of Search .................... 427/27, 33, 185, 195; 118/654, 627, 629, 630, 634

[56] References Cited

U.S. PATENT DOCUMENTS

| | | | |
|---|---|---|---|
| 2,442,986 | 6/1948 | Ransburg | 427/33 |
| 2,625,590 | 1/1953 | Peeps | 118/630 |
| 3,442,251 | 5/1969 | Perkel | 118/326 |
| 3,561,135 | 2/1971 | Fulford | 118/326 |
| 3,646,909 | 3/1972 | Cole et al. | 118/102 |
| 3,976,031 | 8/1976 | Itoh | 118/629 |
| 3,991,710 | 11/1976 | Gourdine et al. | 118/630 |

FOREIGN PATENT DOCUMENTS

| | | | |
|---|---|---|---|
| 2248367 | 4/1973 | Fed. Rep. of Germany | 118/630 |
| 2430990 | 1/1975 | Fed. Rep. of Germany | 427/33 |
| 2212765 | 6/1974 | France | 118/634 |
| 37-2475 | 5/1962 | Japan | 427/33 |
| 38-22146 | 10/1963 | Japan | 427/27 |
| 1025492 | 4/1966 | United Kingdom | 427/195 |

Primary Examiner—John H. Newsome
Attorney, Agent, or Firm—Wenderoth, Lind & Ponack

[57] ABSTRACT

This invention relates to a process for electrostatically coating a substantially axially symmetrical object with pulverized material, characterized by supporting said object maintained at a temperature below the melting point of said pulverized material in an electrostatic coating chamber having a substantially axially symmetrical shape and equipped with silent discharge plate electrodes on the inside of said chamber; feeding electrically charged pulverized material into said chamber; electrostatically coating said object with said pulverized material by the action of silent discharge from said electrodes; and removing surplus pulverized material from specific parts of said object by suction.

This invention further relates to an apparatus used for electrostatically coating a substantially axially symmetrical object with pulverized synthetic resin, which comprises (i) an electrostatic coating chamber where said pulverized synthetic resin is coated on the surface of said object maintained at a temperature below the melting point of said resin; and (ii) a device for removing surplus pulverized resin from specific parts of said object by suction to electrostatically coat the desired parts only.

8 Claims, 10 Drawing Figures

PROCESS FOR ELECTROSTATIC COATING WITH PULVERIZED MATERIAL AND APPARATUS USED IN SAID PROCESS

This is a continuation of application Ser. No. 849,533, filed Nov. 8, 1977 now abandoned.

BACKGROUND OF THE INVENTION

This invention relates to a continuous process for electrostatically coating glass bottles, and other axially symmetrical objects with pulverized material, and an apparatus used in said process. More particularly, this invention relates to a continuous process for electrostatically coating an axially symmetrical object with pulverized synthetic resin and an apparatus used in said process, said process being characterized by electrostatically coating pulverized synthetic resin on the surface of an axially symmetrical object maintained at a temperature below the melting point of the pulverized synthetic resin, removing surplus pulverized synthetic resin (hereinafter referred to as "surplus powder") from the desired parts and then heating the pulverized resin-coated object so as to set and form a resin film on the surface of the axially symmetrical object.

Recently, it is desired to coat a film of synthetic resin on glass bottles of carbonated drinks such as Coca-Cola and the like in order to preventing the glass bottles from breaking during handling and/or because of a rise in internal pressure in the bottles due to sunlight. According to the conventional electrostatic coating process, it is usually necessary to preheat a glass bottle to a temperature above the melting point of the pulverized synthetic resin since a glass bottle is an electric insulator. That is, the conventional electrostatic coating process comprises preheating a glass bottle to a temperature above the melting point of the resin in order to lower the electrical resistance of glass, electrostatically coating pulverized synthetic resin on the preheated glass surface and then post-heating the resin-coated glass bottle to form a film of the resin on the surface of the glass bottle. However, according to this conventional process, it is almost impossible to remove the surplus pulverized resin adhering to the undesired part since the glass bottle is preheated. In order to prevent the pulverized resin from adhering to the undesired part (for example the mouth of the glass bottle), it is suggested to carry out the electrostatic coating while applying a gaseous jet stream to the vicinity of the mouth of the bottle to mask the mouth. However, even by this method, it is substantially impossible to completely mask the mouth of the bottle, and consequently the pulverized resin often adheres to the mouth part of the bottle covered by the cap, thus producing various serious problems such as incomplete capping or decapping and the incorporation of the resin film waste into the contents of the bottle. Moreover, the pulverized resin also adheres to the holding arm or chuck of the holding device, and due to the accumulated and fired resin, the operation of the apparatus must sometimes be suspended. In addition to the above mentioned disadvantages, the thickness of the resin film formed on the upper part of the bottle tends to be uneven and thin, thus resulting in the breakage or exfoliation of the resin film during washing or transportation of the resin-coated bottles. This is a serious problem for returnable glass bottles since the life of the glass bottle is shortened. Furthermore, for the purpose of improving the commercial value of glass bottles, the even coating of the resin film with uniform thickness is required. However, the conventional process comprising electrostatically coating the preheated glass bottle produces the above mentioned disadvantages and does not satisfy this requirement.

SUMMARY OF THE INVENTION

One object of this invention is to remove the above mentioned disadvantages of the conventional process and to provide a process for electrostatically coating a substantially axially symmetrical object with pulverized material, characterized by supporting said object maintained at a temperature below the melting point of said pulverized material in an electrostatic coating chamber having a substantially axially symmetrical shape and equipped with silent discharge plate electrodes on the inside of said chamber; feeding electrically charged pulverized material into said chamber; electrostatically coating said object with said pulverized material by the action of silent discharge from said electrodes; and removing surplus pulverized material from specific parts of said object by suction.

Another object of this invention is to provide an apparatus used for electrostatically coating a substantially axially symmetrical object with pulverized synthetic resin, which comprises (i) an electrostatic coating chamber where said pulverized synthetic resin is coated on the surface of said non-preheated object maintained at a temperature below the melting point of said resin which has been conveyed into said chamber by means of a conveyer-type holding device, and (ii) a device for removing surplus pulverized resin from specific parts of said object by suction. By means of the apparatus of this invention, the pulverized resin is electrostatically coated on the desired part only in such a manner as to form a pulverized resin layer having a uniform thickness and a distinct boundary. The pulverized resin-coated object is then heated to produce an object coated with a synthetic resin film having a high endurance. Thus, the apparatus of this invention provides a resin-coated object having a high commercial value at a high productivity.

DESCRIPTION OF THE PREFERRED EMBODIMENTS

The accompanying drawings illustrate the preferred embodiments of this invention.

As shown in the accompanying drawings, the apparatus used for practicing the process of this invention comprises (i) an electrostatic coating chamber where pulverized synthetic resin is coated on the surface of an axially symmetrical object such as a glass bottle conveyed into said chamber by means of a chuck of a movable holding device, and (ii) a device for removing surplus powder from the specific parts including the mouth and/or bottom which are not desired to be coated.

Figure 1:
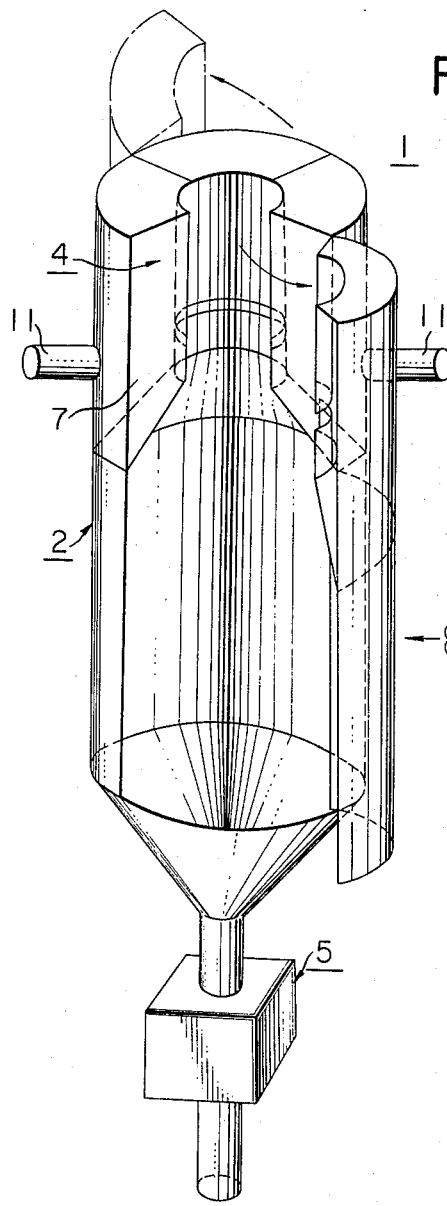
FIG. 1 shows an outline of an electrostatic coating chamber used in this invention.
Figure 2:
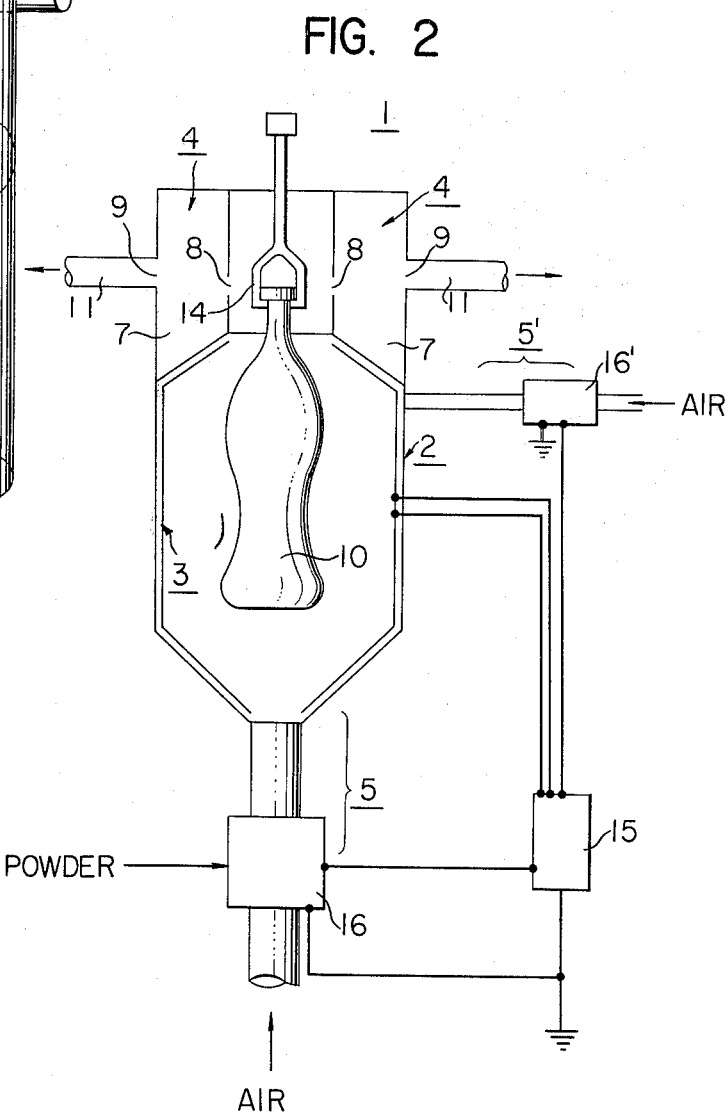
FIG. 2 shows a sectional view of the electrostatic coating chamber of FIG. 1.
Figure 3:
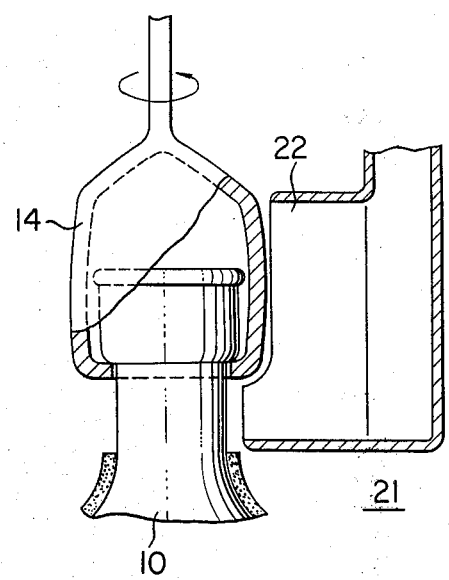
FIG. 3 shows a sectional view of an upper suction slit used in the device for removing surplus powder.
Figure 4:
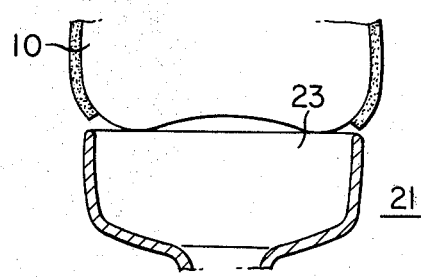
FIG. 4 shows a sectional view of a lower suction slit used in the device for removing surplus powder.

As can be seen from FIGS. 1 and 2, the electrostatic coating chamber 1 is composed of a chamber body 2 having a substantially axially symmetrical shape (e.e. cylindrical or polygonal shape); a silent discharge plate electrode 3 on the inside of the chamber body 2; a circular chamber 4 having a suction part 7 positioned at the upper part of the chamber body 2; and a pulverized resin feeder 5 at the bottom of the chamber body 2 which feeds electrically charged pulverized resin into the chamber body 2 by means of an air flow. The chamber body 2 is divided into four parts, and the two parts opposite to each other can be opened in such a manner as to be an inlet or outlet for a glass bottle 10 and to permit the passage of the glass bottle therethrough or only one of the four parts may be opened in such a manner as to work as both an inlet and outlet. The circular chamber 4 positioned at the upper part of the chamber body 2 has the suction part 7 of the device comprising a circlar suction slit opening 8 on the inner side of the circular chamber and and outlet 9 on the outer side of the circular chamber, the outlet 9 being connected to an appropriate dust collector and a suction fan (not shown) by way of a suction pipe 11. The center of the top of the chamber body 2 is open in such a manner as to permit the free entry and exit of a glass bottle 10 grasped and suspended by a chuck 14 of a conveyer-type holding device.

The electrostatic coating chamber comprises the chamber body 2 having silent discharge plate electrodes 3 equipped on each of the divided four parts of the chamber body. These electrodes 3 are connected to an appropriate electric controller 15 which controls the electric current or voltage of the electrodes.

The pulverized resin feeder 5 positioned at the bottom of the chamber body 2 includes an electrical pre-charging device 16 where pulverized resin is charged by corona discharge, contact charging or other appropriate methods in the polarity the same as that of said silent discharge plate electrode, and feeds the charged pulverized resin into the chamber body 2 by means of an air flow. This electrical pre-charging device 16 is also connected to the electrical controller 15, thus the electrical current or voltage of the device 16 being appropriately controlled. As disclosed in Japanese patent application Laid Open No. 51-8347, corresponding to U.S. Pat. No. 3,976,031, issued Aug. 24, 1976, the silent discharge plate electrodes are composed of parallel filament electrodes embedded in plates of insulating material. The silent discharge is produced on the surface of the plates by applying AC voltage between the parallel filament electrodes, a minute discharge current and electric field flowing from the plates to the glass bottle being produced by superimposing DC voltage on the AC voltage while preventing the pulverized resin from adhering to the surface of the plates.

Thus, the pulverized resin electrically pre-charged in the feeder 5 and fed into the chamber body 2 is electrostatically coated on the surface of the glass bottle grasped and suspended by the chuck 14 of the holding device in the chamber body 2 by means of the action of the electrical field generated from the silent discharge electrodes 3 to the glass bottle 10. If desired, the glass bottle may be rotated in order to produce a uniform pulverized resin layer. Pulverized resin which is not deposited on the surface of the bottle is collected by the suction part 7 of the circular chamber 4 for reuse.

The chamber body 2 may additionally have on its side a pulverized resin feeder 5' including a pre-charging device 16' and having the same function as the above mentioned pulverized resin feeder 5 including the device 16. The additional pulverized resin feeder feeds resin powder into the glass bottle from the lateral direction, and is useful for producing an especially thick pulverized resin layer on a specified part of the bottle or adjusting the thickness of the layer depending on the shape of the bottle.

Following the electrostatic coating chamber 1, a device 21 for removing "surplus powder" as shown in FIGS. 3 to 6 is provided in such a manner as to remove powder from specific parts including the top and/or the bottom of the bottle. As can be seen from the drawings, the surplus powder-removing device. It comprises suction slits 22 and 23 respectively positioned close to the top and the bottom of the bottle 10, the suction slits 22 and 23 being connected to an appropriate dust collector and a suction fan (not shown) to remove surplus powder from the specific parts just mentioned and collect the resin powder. When the bottle electrostatically coated with pulverized resin in the chamber 1 is conveyed to the surplus powder-removing device 21, the chuck 14 of the holding device is rotated by an appropriate means, thus removing the powder from the specific parts including the head and/or bottom.

The suction slits 22 and 23 may optionally have squeegees made of an elastic material such as rubber to facilitate the removal of the surplus powder. The suction slits 22 and 23 may also be equipped with an elastic element such as a spring in such a manner as to constantly maintain intimate contact between the squeegee and the chuck or the specific parts of the bottle from which surplus powder is to be removed.

Figure 7:
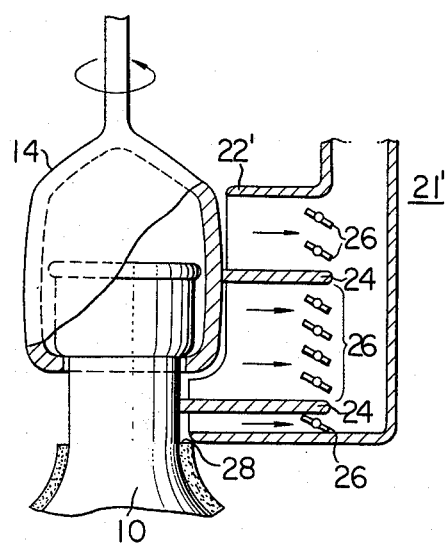
FIG. 7 shows a modified type of the upper suction slit as shown in FIG. 3.
Figure 5:
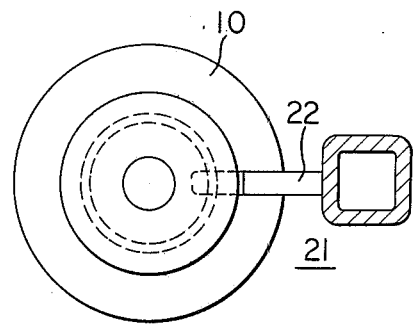
FIG. 5 shows a plane view of FIG. 3.
Figure 6:
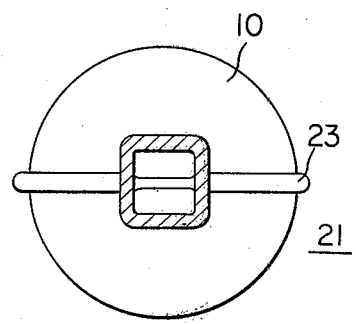
FIG. 6 shows a bottom view of FIG. 4.
Figure 8:
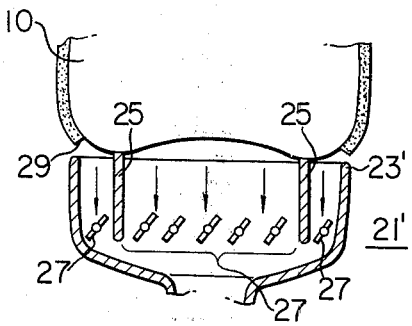
FIG. 8 shows a modified type of the lower suction slit as shown in FIG. 4.

As can be seen from FIGS. 7 and 8, the amount of suction draft may be controlled in such a manner as to more satisfactorily raise the suction efficiency depending on the part and shape of the bottle by dividing the suction mouth of upper and lower suction slits 22' and 23' of the surplus powder-removing device 21' with appropriate partition plates 24 and 25 and providing draft controllers 26 and 27 at each suction mouth. Furthermore, the partition plates 24 and 25 should preferably protrude to a small degree from the suction mouth level in such a manner as to work as a spacer between the suction slits and the chuck of the holding device, the top and the bottom of the bottle to retain an appropriate gap between them.

Referring to FIG. 7, it is generally preferable to make the suction draft rate in the vicinity of the chuck 14 relatively high for the purpose of completely removing powder from the chuck, while the suction draft rate for producing a sharp boundary 28 at the upper end of the pulverized resin layer should be determined depending on the amount of electrical charge and the adhesive force of the pulverized resin layer but is generally made relatively lower as compared to the suction draft rate in the vicinity of the chuck. This situation is also true with regard to the suction draft rate for producing a sharp boundary 29 and the suction draft rate for completely removing surplus powder from the center part of the bottom as shown in FIG. 8. That is, the suction draft rate for producing the sharp boundary is relatively lower, while the suction draft rate in the vicinity of the center part of the bottom is relatively higher. It should be noted that if desired, the surplus powder-removing system of this invention can be optionally applied to parts other than the mouth and the bottom of the bottle.

Figure 9:
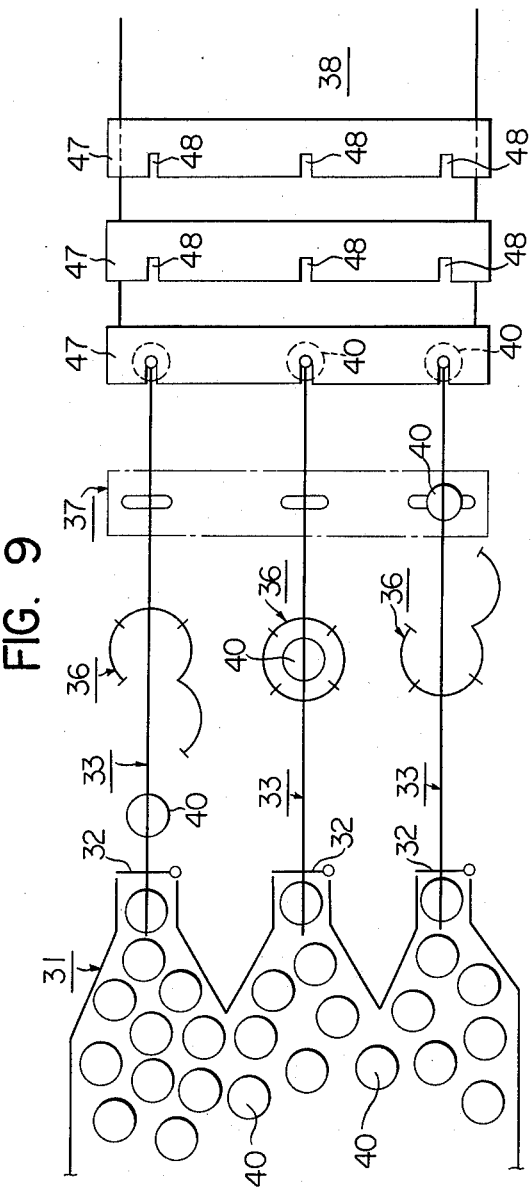
FIG. 9 shows a plane view of the whole system involving the apparatus for electrostatically coating glass bottles with pulverized material in accordance with this invention.
Figure 10:
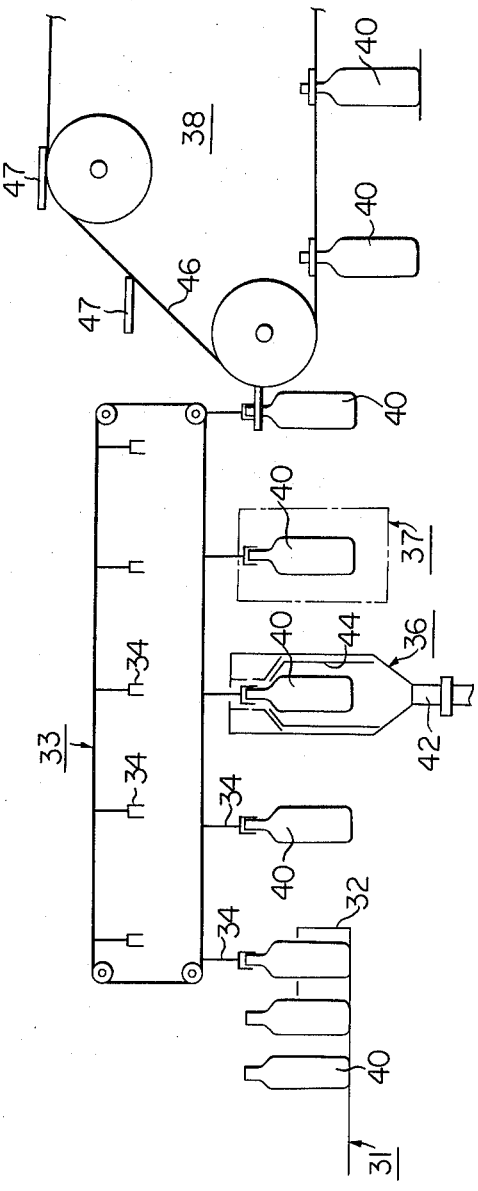
FIG. 10 shows a side view of the whole system as shown in FIG. 9.

FIGS. 9 and 10 show the whole system involving the apparatus for electrostatically coating glass bottles with pulverized material comprising the electrostatic coating chamber and the surplus resin-removing device of this invention.

This system comprises a bottle-feeder 31 having plural feeding mouths 32 to feed empty bottles; plural endless conveyor type holding devices 33 having chucks 34 to grasp the heads of the bottles fed in parallel from each feeding mouth; plural electrostatic coating chambers 36 and surplus powder-removing devices 37; and an appropriate heating device 38. FIG. 9 shows the electrostatic coating chambers 36 in various stages, that is, in the stage of opening an entrance door, in the stage of carrying out the electrostatic coating and in the stage of opening an exit door. However, this is for the convenience for explanation, and in the practical operation, each electrostatic coating chamber takes the same action in unison. The number of the electrostatic coating chambers may be optionally increased if desired.

Bottles 40 are fed to each feeding mouth 32 one by one by a bottle-feeder 31 such as a vibration conveyor. The head of the bottle 40 is then grasped by a chuck 34 of a conveyor type holding device 33 and the bottle is conveyed to the electrostatic coating chamber 36. An inlet of four divided parts of the electrostatic coating chamber 36 is opened to take in the bottle 40 conveyed by the device 33. The inlet is then closed, and electrically pre-charged pulverized resin is fed into the electrostatic coating chamber 36 with an air flow from a pulverized resin feeder 42, the pulverized resin thus being electrostatically coated on the surface of the bottle 40 by the action of the electric field generated from electrodes 44 to the bottle. After the electrostatic coating is finished, an exit of the chamber 36 is opened, and the pulverized resin-coated bottle 40 is taken out and conveyed to surplus powder-removing device 37 by means of the conveyor type holding device 33. In the surplus powder-removing device 37, the pulverized resin on specific parts including the head and/or bottom of the bottle is removed.

The bottle having the pulverized resin layer coated on the desired part only is then hooked and transferred by a notch 48 of a supporting plate 47 of a conveyor 46 of a heating device 38, and is heated in the heating device 38 to produce a synthetic resin film firmly adhering to the surface of the bottle.

In this type of system, it is preferable to use such a holding device as will temporarily stop for the time required to finish the electrostatic coating in the electrostatic coating chamber and the removal of surplus powder in the surplus powder-removing device.

In this type of system, even if trouble occurs in the electrostatic coating chamber or other parts of one of the routes, it is possible to repair the trouble merely by stopping the chuck of the holding device and closing the feeding mouth on the same route while continuing other route operations. Also, if a bottle is not grasped by the chuck of the holding device for some reasons, this trouble is detected and the feeding of the pulverized resin is stopped, thus preventing the chuck from being covered with the resin.

As mentioned above, according to the present invention, pulverized resin is electrostatically coated on the surface of a glass bottle in such a manner as to produce a tight pulverized resin layer having a uniform thickness which is well charged and strongly adheres to the glass surface, and surplus powder is satisfactorily removed, thus producing a sharp boundary. The pulverized resin-coated bottle is then post-heated to produce a strong resin film having a uniform thickness on the bottle surface, thereby prolonging the life of the bottle and increasing its commercial value. Moreover, according to the present invention, surplus powder on the holding device is completely removed, the apparatus can be continuously operated for a long time, thus raising productivity very high.

The present invention is illustrated with regard to the case of electrostatically coating a glass bottle with pulverized resin, but it should be noted that the present invention can also be applied to other substantially axially symmetrical objects such as bowling pins and the like. Also, in addition to synthetic resins, other inorganic powders such as enamel frit powders and the like can also be used in the present invention.

What we claim is:

1. A process for electrostatically coating an electrically non-conductive object with pulverized material, which comprises the steps of supporting said object maintained at a temperature below the melting point of said pulverized material by means of a holding device in an electrostatic coating chamber having a substantially axially symmetrical shape and equipped with silent discharge plate electrodes on the inside of said chamber; electrically precharging said pulverized material in the same polarity as that of said silent discharge plate electrode; feeding the electrically precharged pulverized material into said chamber from the lower part of said chamber in such a manner as to flow upwards; electrostatically coating said object with said electrically precharged pulverized material; and recovering surplus pulverized material, which is not coated on said object from the upper part of said chamber; said silent discharge being caused on the surface of the plate electrode by applying an AC voltage, and superimposing a DC voltage in the AC voltage to cause a minute discharge current and electric field to flow from the plate electrode to the object being produced.

2. The process according to claim 1, wherein said process further comprises an additional step of removing surplus pulverized material from specific parts of said object and/or the chuck of said holding device by suction by using a suction slit opening positioned close to the specific parts of said object and/or the chuck from which surplus pulverized material is to be removed.

3. An electrically non-conductive apparatus used for electrostatically coating an object with pulverized material, which comprises a holding device to support said object and an electrostatic coating chamber where said pulverized material is coated on the surface of said object maintained at a temperature below the melting point of said pulverized material;

said electrostatic coating chamber comprising a chamber body having a substantially axially symmetrical shape, silent discharge plate electrodes on the inside of said chamber body, a suction part positioned at the upper part of said chamber body to recover surplus pulverized material which is not coated on said object, and a pulverized material feeder having an electrical charging device positioned at the lower part of said chamber body to electrically precharge said pulverized material in the same polarity as that of said silent discharge plate electrode and to feed the electrically precharged pulverized material into the lower part of said chamber in such a manner as to flow upwards, at least one part of said chamber body being able to open in such a manner as to work as an entrance and exit for said object to be coated;

said silent discharge being caused on the surface of the plate electrode by applying an AC voltage, and superimposing a DC voltage on the AC voltage to cause a minute discharge and electric field to flow from the plate electrode to the object being produced.

4. The apparatus according to claim 3, wherein said apparatus further comprises an additional device for removing surplus pulverized material from specific parts of said object and/or the chuck of said holding device; said device for removing surplus pulverized material being a suction slit opening positioned close to the specific parts of said object and/or the chuck from which surplus pulverized material is to be removed.

5. The apparatus according to claim 3, wherein said chamber body is divided into four parts, and the two parts opposite to each other can be opened in such a manner as to work as an inlet or outlet.

6. The process according to claim 1 in which the electrically non-conductive object is a bottle.

7. A process according to claim 6 in which the pulverized coating is a pulverized resin and in which the electrostatically coated layer is subjected to a post-heating to produce a strong resin film having a uniform thickness on the bottle 8. A process for electrostatically coating glass bottles with a pulverized resin material which comprises feeding glass bottles from a plurality of bottle feeders located in parallel with each other onto a plurality of parallel conveyor holding devices in tandem with the individual bottle feeders, said holding devices having chucks to grasp the necks of the individual bottles; transferring the individual bottles to electrocoating chambers located on each of the parallel routes located along the path of the conveyor holding devices, said coating chambers having substantially axially symmetrical shapes and equipped with silent discharge plate electrodes on the inside of each chamber; electrically precharging said pulverized resin material in the same polarity as that of said silent discharge plate electrode; feeding the electrically precharged pulverized resin material into each of said coating chambers from the lower part of said chambers by means of an air flow; electrostatically coating said bottles by the action of the electric field generated from the electrodes to the bottle; removing the thus electrocoated glass bottle from the coating chambers by means of said conveyor holding devices; transferring the bottles into separate resin powder-removing to remove excess resin powder deposited on certain portions of the glass bottle by means of suction; and transferring the bottles to a heating device to heat the resin so as to form a strong resin film of uniform thickness on the bottle.

* * * * *